(12) United States Patent
Matsumoto

(10) Patent No.: US 10,774,252 B2
(45) Date of Patent: *Sep. 15, 2020

(54) LUBRICANT OIL COMPOSITION FOR COMPRESSION REFRIGERATOR

(71) Applicant: IDEMITSU KOSAN CO., LTD., Tokyo (JP)

(72) Inventor: Tomoya Matsumoto, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,879

(22) Filed: Nov. 4, 2015

(65) Prior Publication Data

US 2016/0053154 A1 Feb. 25, 2016

Related U.S. Application Data

(62) Division of application No. 13/822,894, filed as application No. PCT/JP2011/072162 on Sep. 28, 2011, now abandoned.

(30) Foreign Application Priority Data

Sep. 28, 2010 (JP) .................. 2010-217917

(51) Int. Cl.
| | | |
|---|---|---|
| *C10M 171/00* | (2006.01) | |
| *C09K 5/04* | (2006.01) | |
| *C10M 127/00* | (2006.01) | |
| *C10N 20/02* | (2006.01) | |
| *C10N 20/04* | (2006.01) | |
| *C10N 20/00* | (2006.01) | |
| *C10N 30/08* | (2006.01) | |
| *C10N 30/10* | (2006.01) | |
| *C10N 30/00* | (2006.01) | |
| *C10N 40/30* | (2006.01) | |
| *C10N 80/00* | (2006.01) | |

(52) U.S. Cl.
CPC .......... *C09K 5/045* (2013.01); *C10M 127/00* (2013.01); *C10M 171/008* (2013.01); *C09K 2205/122* (2013.01); *C10M 2203/024* (2013.01); *C10M 2203/04* (2013.01); *C10M 2207/026* (2013.01); *C10M 2207/042* (2013.01); *C10M 2207/2835* (2013.01); *C10M 2209/043* (2013.01); *C10M 2209/1033* (2013.01); *C10M 2209/1055* (2013.01); *C10M 2223/041* (2013.01); *C10M 2229/02* (2013.01); *C10N 2020/02* (2013.01); *C10N 2020/04* (2013.01); *C10N 2020/067* (2020.05); *C10N 2020/101* (2020.05); *C10N 2030/08* (2013.01); *C10N 2030/10* (2013.01); *C10N 2030/64* (2020.05); *C10N 2040/30* (2013.01); *C10N 2080/00* (2013.01)

(58) Field of Classification Search
CPC .......... C10M 171/008; C10M 2203/04; C10M 2207/026; C10M 2203/024; C10M 127/00; C10M 2207/042; C10M 2207/2835; C10M 2209/1033; C10M 2209/1055; C10M 2223/041; C10M 2229/02; C10M 2209/043; C10N 2230/08; C10N 2220/021; C10N 2220/022; C10N 2220/302; C10N 2230/10; C10N 2230/64; C10N 2240/30; C10N 2203/024; C10N 2220/026; C10N 2280/00

See application file for complete search history.

(56) References Cited

U.S. PATENT DOCUMENTS

| | | | | |
|---|---|---|---|---|
| 5,454,963 A | * | 10/1995 | Kaneko | ............... C10M 129/18 508/304 |
| 6,248,256 B1 | * | 6/2001 | Nagao | .................. C09K 5/042 252/67 |
| 6,495,062 B2 | * | 12/2002 | Nagao | .................. C09K 5/042 252/67 |
| 9,115,301 B2 | * | 8/2015 | Matsumoto | ........... C09K 5/045 |
| 2007/0108403 A1 | * | 5/2007 | Sievert | ................. C09K 5/045 252/67 |

(Continued)

FOREIGN PATENT DOCUMENTS

| | | |
|---|---|---|
| EP | 2 551 333 A1 | 1/2013 |
| JP | 2 258896 | 10/1990 |

(Continued)

OTHER PUBLICATIONS

International Search Report dated Dec. 27, 2011 in PCT/JP11/72162 Filed Sep. 28, 2011.

(Continued)

*Primary Examiner* — Taiwo Oladapo
(74) *Attorney, Agent, or Firm* — Oblon, McClelland, Maier & Neustadt, L.L.P.

(57) ABSTRACT

It is to provide a lubricating oil composition for a compression refrigerator, which is excellent in the thermal/chemical stability even when used in a compression refrigerator that uses a saturated fluorinated hydrocarbon refrigerant having a lower global warming potential and a fewer carbon atoms, by including in a base oil an organic compound having a double bond in a molecule, which is at least one kind selected from an organic compound having at least two non-conjugated double bonds in the molecule, a terpene compound having a double bond in the molecule, and $C_{12}$ to $C_{30}$ aliphatic unsaturated hydrocarbon having one double bond in the molecule.

13 Claims, No Drawings

(56) References Cited

U.S. PATENT DOCUMENTS

| | | | |
|---|---|---|---|
| 2009/0267019 A1* | 10/2009 | Yana Motta | C09K 5/045 252/68 |
| 2010/0234256 A1* | 9/2010 | Sato | C09K 5/045 508/463 |
| 2013/0012419 A1 | 1/2013 | Matsumoto | |

FOREIGN PATENT DOCUMENTS

| | | | |
|---|---|---|---|
| JP | 2 281098 | | 11/1990 |
| JP | 2 305893 | | 12/1990 |
| JP | 5-295386 | A | 11/1993 |
| JP | 05295386 | A * | 11/1993 |
| JP | 08-245952 | A | 9/1996 |
| JP | 2001 183020 | | 7/2001 |
| JP | 2008-504373 | A | 2/2008 |
| JP | 2008 208261 | | 9/2008 |
| JP | 2009 518460 | | 5/2009 |
| KR | 10-2010-0091225 | A | 8/2010 |
| WO | WO 96/04355 | A1 | 2/1996 |
| WO | WO 2007/053697 | A2 | 5/2007 |
| WO | WO 2008/065011 | A1 | 6/2008 |
| WO | 2009 066722 | | 5/2009 |

OTHER PUBLICATIONS

Office Action dated Jul. 22, 2014 in the corresponding Japanese Patent Application No. JP2010-217917.
Extended European Search Report dated Apr. 9, 2014 in the corresponding European Application No. 11829170.7.
Communication Pursuant to Article 94(3) EPC dated Jun. 13, 2017 in European Patent Application No. 11 829 170.7.
Office Action dated Jul. 13, 2017 in Korean Patent Application No. 10-2013-7007470.
Office Action dated Jun. 22, 2018 in Indian Patent Application No. 2258/CHENP/2013, 6 pages.

* cited by examiner

LUBRICANT OIL COMPOSITION FOR COMPRESSION REFRIGERATOR

CROSS REFERENCE TO RELATED APPLICATIONS

This application is a division of U.S. application Ser. No. 13/822,894, filed Jun. 10, 2013; now pending; which is a 371 of PCT/JP2011/072162, filed Sep. 28, 2011, the disclosures of which are incorporated herein by reference in their entireties. This application claims priority to Japanese Patent Application No. 2010-217917, filed Sep. 28, 2010, the disclosure of which is incorporated herein by reference in its entirety.

TECHNICAL FIELD

The present invention relates to a lubricating oil composition for a compression refrigerator, and more particularly to a lubricating oil composition for a compression refrigerator, which uses a saturated fluorinated hydrocarbon having a fewer carbon atoms as a refrigerant and is excellent in the thermal and oxidation stability.

BACKGROUND ART

In recent years, in compression refrigerators such as air conditioners, car air conditioners and the like, a $C_1$ or $C_2$ saturated fluorinated hydrocarbon (HFC), which is a refrigerant that does not deplete an ozone layer has been used. However, recently, these compression refrigerators have been used under severe conditions for more and more longer time.

Accordingly, as a lubricating oil composition for a compression refrigerator like this, a lubricant oil excellent in the thermal and oxidation stability is in demand.

Further, in various compression refrigerators including air conditioners, as the HFC refrigerant that does not deplete an ozone layer, mixed refrigerants containing difluoromethane (R32) such as R410A, R407C and so on have been used.

However, in addition to protection of the ozone layer, prevention of global warming is required, and it has been desired to use a refrigerant containing much more R32 that has lower global warming potential.

The R32 has relatively high theoretical COP and thermal conductivity and low pressure loss of a refrigerant; accordingly, when used in an air conditioner, the air conditioner is characterized by high energy efficiency.

However, the R32 is characterized in that the discharge temperature of a compressor is higher by about 20° C. than that of conventional R410A or R407C.

From a situation like this, an improvement in a structure of a refrigerator as shown in Patent Document 1 for example has been under study.

Further, as a lubricant oil for a compression refrigerator that uses these refrigerants, a lubricating oil composition having high thermal and oxidation stability under the presence of these refrigerants is in demand.

The requirement like this was considered that it can be handled, as described in Patent Documents 2 to 4, for example, by blending an existing antioxidant or acid scavenger that is used in R134a or the like in a saturated HFC that is high in the stability different from an unsaturated HFC or an iodide. However, even when an existing antioxidant or acid scavenger is simply compounded or a compounding amount thereof was increased, an improving effect thereof is low.

PRIOR ART DOCUMENTS

Patent Documents

[Patent Document 1] JP 2001-183020A
[Patent Document 2] JP 02-258896A
[Patent Document 3] JP 02-281098A
[Patent Document 4] JP 02-305893A

SUMMARY OF THE INVENTION

Problems to be Solved by the Invention

It is the object of the present invention to provide a lubricating oil composition for a compression refrigerator, which is excellent in the thermal and oxidation stability, even when used, under the situation like this, in a compression refrigerator that uses a saturated fluorinated hydrocarbon refrigerant that has lower global warming potential and has a fewer carbon atoms.

Means for Solving the Problems

The inventors have made an earnest study with a view toward accomplishing the above-described object and, as a result, found that the above-described object can be achieved by allowing a base oil to contain a specific organic compound having a double bond in a molecule as a stabilizer. The present invention has been completed based on the above finding.

Thus, the present invention provides as follows:

(1) a lubricating oil composition for a compression refrigerator that uses a refrigerant containing $C_1$ to $C_3$ saturated fluorinated hydrocarbon, the lubricating oil composition including a base oil and an organic compound having a double bond in a molecule, which is at least one kind selected from an organic compound having at least two non-conjugated double bonds in the molecule, a terpene compound having a double bond in the molecule, and $C_{12}$ to $C_{30}$ aliphatic unsaturated hydrocarbon having one double bond in the molecule, (2) the lubricating oil composition for a compression refrigerator described in the (1), in which the organic compound having at least two non-conjugated double bonds in the molecule is a compound having a 1,4-diene structure, (3) the lubricating oil composition for a compression refrigerator described in the (1), in which the organic compound having at least two non-conjugated double bonds in the molecule is a compound having a bridged cyclic structure, (4) the lubricating oil composition for a compression refrigerator described in the (1), in which the terpene compound having one double bond in the molecule is a pinene compound, (5) the lubricating oil composition for a compression refrigerator described in any one of (1) to (4), in which a compounding amount of the organic compound having one double bond in the molecule is 0.1% by mass or more and 10% by mass or less based on a total amount of the composition, (6) the lubricating oil composition for a compression refrigerator described in the (1), in which the $C_1$ to $C_3$ saturated fluorinated hydrocarbon is difluoromethane (R32), (7) the lubricating oil composition for a compression refrigerator described in the (1), in which the refrigerant is a mixture of difluoromethane (R32) and pentafluoroethane (R125), or a mixture of difluoromethane (R32), pentafluoroethane (R125) and 1,1,1,2 tetrafluoroethane (R134a), (8) the lubricating oil composition for a compression refrigerator described in the (7), in which the refrigerant is a refrigerant that contains 20% by mass or more of difluoromethane (R32), (9) the lubricating oil composition for a compression refrigerator described in any one of (1) to (8), in which the base oil contains at least one kind selected from polyoxyalkylene glycols, polyvinyl ethers, a copolymer between poly(oxy)alkylene glycol or monoether thereof and polyvinyl ether, polyol esters and polycarbonates as a main component,

(10) the lubricating oil composition for a compression refrigerator described in any one of (1) to (9), in which the kinematic viscosity at 100° C. of the base oil is 1 mm$^2$/s or more and 50 mm$^2$/s or less,

(11) the lubricating oil composition for a compression refrigerator described in any one of (1) to (10), in which the number average molecular weight of the base oil is 300 or more and 3000 or less,

(12) the lubricating oil composition for a compression refrigerator described in any one of (1) to (11), in which the viscosity index of the base oil is 60 or more,

(13) the lubricating oil composition for a compression refrigerator described in any one of (1) to (12), in which at least one kind of additive selected from an extreme pressure agent, an oiliness agent, an antioxidant, an acid scavenger, a metal deactivator and an antifoaming agent is further contained,

(14) the lubricating oil composition for a compression refrigerator described in any one of (1) to (13), in which a sliding part of a compression refrigerator is made of an engineering plastic or has an organic coating film or an inorganic coating film,

(15) the lubricating oil composition for a compression refrigerator described in (14), in which the organic coating film is any one of a polytetrafluoroethylene coating film, a polyimide coating film, a polyamideimide coating film, and a thermosetting insulating film formed with a resin coating material that contains a resin base material of a polyhydroxy ether resin and a polysulfonic resin and a crosslinking agent,

(16) the lubricating oil composition for a compression refrigerator described in (14), in which the inorganic coating film is any one of a graphite film, a diamond-like carbon film, a tin film, a chromium film, a nickel film and a molybdenum film,

(17) the lubricating oil composition for a compression refrigerator described in any one of (1) to (16), wherein the lubricating oil composition is used in a car air conditioner, an electric car air conditioner, a gas heat pump, an air conditioner, a refrigerator, an automatic vending machine, a show case, a hot-water supply system or a freezing and heating system, and

(18) the lubricating oil composition for a compression refrigerator described in (17), in which a moisture content in an applied system is 300 ppm by mass or less, and residual air partial pressure is 10 kPa or less.

Advantages of the Invention

According to the present invention, it is possible to provide a lubricating oil composition for a compression refrigerator, which is excellent in the thermal/chemical stability even when used in a compression refrigerator that uses a saturated fluorinated hydrocarbon refrigerant having a lower global warming potential and a fewer carbon atoms.

EMBODIMENTS FOR CARRYING OUT THE INVENTION

The lubricating oil composition for a compression refrigerator according to the present invention contains a base oil and an organic compound having a double bond in a molecule, which is at least one kind selected from an organic compound having at least two non-conjugated double bonds in one molecule, a terpene compound having a double bond in the molecule, and $C_{12}$ to $C_{30}$ aliphatic unsaturated hydrocarbon having one double bond in the molecule.

<Organic Compound Having Double Bond in Molecule>
(Organic Compound Having at Least Two Non-Conjugated Double Bonds in Molecule)

The non-conjugated double bond means a relationship where double bonds are separated by two or more single bonds. Further, the double bond may be contained or may not be contained in an aromatic ring. In the case of a non-conjugated diene, a non-conjugated double bond is counted as two double bonds.

The number of non-conjugated double bonds contained in the molecule is preferably two or more and four or less, more preferably three or less, and particularly preferably two. The upper limit of the numbers of non-conjugated double bonds is about 10.

The organic compound having two or more non-conjugated double bonds in the molecule like this preferably has a 1,4-diene structure or a bridged cyclic structure.

Here, the 1,4-diene structure means a structure having a double bond at each of 1 position and 4 position. The bridged cyclic structure means a structure where in at least one ring, a bond (may have a double bond) that splits the ring is present.

Examples of organic compounds having the 1,4-diene structure include 1,4-cyclohexadiene, 2-vinyl-1-methylenecyclopropane, 1,3-dimethylenecyclobutane, 4-methylenecyclopentene, 2-methyl-1,4-pentadiene, 1,4-hexadiene, 3-methyl-1,4-pentadiene, 3-methyl-1,4-cyclohexadiene, 1,4-cycloheptadiene, 3-vinyl-1,4-pentadiene, 2,5-heptadiene, 4-methylenecyclohexene, 5-methyl-1,4-hexadiene, 2,4-dimethyl-1,4-pentadiene, 1,4-cyclooctadiene, 2,3-dimethyl-1,4-hexadiene, 3-methyl-1,4-heptadiene, 1,4,7-cyclononatriene, 1,3,5-trimethyl-1,4-cyclohexadiene, (Z)-1,4-nonadiene, 1,3,5-tris(methylene)cycloheptane, 3,4-divinyl-1,5-hexadiene, 3-ethyl-1,4-octadiene, 1,4-decadiene, 1,4-undecadiene, 2,4,5,6-pentamethyl-1,4-cyclooctadiene, 7-ethenyl-5-undecene, 2-nonyl-1,4-pentadiene, 4-pentyl-1,4-decadiene, 2-decyl-1,4-pentadiene, 6,9-pentadecadiene, 1,7,10-hexadecatriene, dihydroaplotaxene, 1,8,11-heptadecatriene, 3,6,9-heptadecatriene, 6,9-heptadecadiene, 3,6,9-octadecatriene, 6,9,12-octadecatriene, 6,9-octadecadiene, 3,6,9-nonadecatriene, 2,6-dimethyl-2,6,9-heptadecatriene, 2,2-dimethyl-6-pentyl-3,6-dodecadiene, 2,4,6,8,10,12-hexamethyl-1,12-tridecadiene, 7,11,15-trimethyl-1,4-heptadecadiene, and 1,4-p-mentadiene. Among these, 1,4-p-mentadiene, 1,4-cyclohexadiene, and 1,4-hexadiene, which are high in the reactivity with oxygen are more preferably used.

Further, examples of organic compounds having the bridged cyclic structure include 2,5-norbornadiene, 5-ethylidene-2-norbornen, 5-vinyl-2-norbornen, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7-dimethyl-2, 5-norbornadiene, 7-methyl-7-ethyl-2,5-norbornadiene, 1-methyl-2,5-norbornadiene, 1-ethyl-2,5-norbornadiene, 1-propyl-2,5-norbornadiene, 1-butyl-2,5-norbornadiene, bicyclo[3.2.0]hepta-2,6-diene, homotropilidene, 5-methylenebicyclo[2,2,1]hepta-2-ene, bicycle[2.2.2]octa-2,5-diene, and bicycle[3.2.1]octa-2,6-diene.

Among these, 2,5-norbornadiene high in the reactivity with oxygen is more preferably used.

Examples of other organic compounds having at least two non-conjugated double bonds in the molecule include 1,5-hexadiene, 1-methyl-1,5-cyclohexadiene, 3-methylene-1,5-hexadiene, 2-methyl-1,5-hexadiene, 4-methyl-1,5-hexadiene, 2-methyl-1,5-hexadiene, 3-methyl-1,5-hexadiene, 1,6-heptadiene, 1,5-heptadiene, 4-vinyl-1-cyclohexene, 1,5-cyclooctadiene, 1,4-bismethylenecyclohexane, 1,7-octadiene, 2,5-dimethyl-1,5-hexadiene, 3-ethyl-1,5-hexadiene, 2,6-octadiene, 1,6-octadiene, 1-methyl-2,3-divinylcyclobutane, 1-(1-methylethenyl)-3-cyclohexene, 1-methyl-5-vinyl-1-cyclohexene, 1-methyl-1-ethenyl-3-cyclohexene, 3,5-dimethyl-1,6-heptadiene, 3,3-dimethyl-1,6-heptadiene, 4-methyl-2,6-octadiene, 2,5-dimethyl-1,6-heptadiene, 3,6-dimethyl-1,5-heptadiene, myrcene, cyclodeca-1,6-diene, 1,5-cyclodecadiene, 2,7-dimethyl-2,6-octadiene, 1,5,9-cyclododecatriene, 1,1'-bi[2-cyclohexene], 3-cyclohexyl-1,5-hexadiene, 6-methylene-1,10-undecadiene, 1,5-cyclododecadiene, 6,10-dimethyl-1,5,9-undecatriene, 1,12-tridecadiene, 2,6-dimethyl-1,6-undecadiene, 1,8-cyclotetradecadiene, 8-cyclohexyl-1,5-octadiene, 7,11-dimethyl-1,6,10-dodecadiene, 1,13-tetradecadiene, 3-isopropyl-2,5,7-trimethyl-1,5-octadiene, 4,5-dipropyl-1,7-octadiene, 1,9-cyclohexadecadiene, 1,7-hexadecadiene, 2,4,6,8,10-pentamethyl-1,10-undecadiene, 8,14-heptadecadiene, 1,1,1-octadecadiene, 9-ethylidene-1,16-heptadecadiene, 1,11-cycloicosadiene, 1,9-icosadiene, icosa-7,13-diene, and 4,9-dibutyl-1,11-dodecadiene.

(Terpene Compound Having Double Bond in Molecule)

As the terpene compound having a double bond in the molecule, a dimer to an octamer of isoprene are preferred, and, in particular, an aliphatic unsaturated hydrocarbon, in particular, α-pinene and β-pinene are preferred.

($C_{12}$ to $C_{30}$ Aliphatic Unsaturated Hydrocarbon Having One Double Bond in Molecule)

As the $C_{12}$ to $C_{30}$ aliphatic unsaturated hydrocarbon having one double bond in a molecule, $C_{12}$ to $C_{30}$ α-olefins are preferred, for example, 1-tetradecene, 1-hexadecene, 1-octadecene, and 1-eicosene can be cited.

Among three kinds of organic compounds having a double bond in the molecule in the invention, a terpene compound having a double bond in the molecule is preferred, and, pinene, in particular, β-pinene is preferred.

A compounded amount of the organic compound having a double bond in the molecule as described above is, on the basis of an entire composition, preferable to be 0.1% by mass or more and 10% by mass or less. When the compounded amount is in the above range, while maintaining the compatibility with a refrigerant, a function as an oxygen scavenger can be sufficiently exerted.

The compounded amount is preferable to be 0.1% by mass or more and 5% by mass or less, and more preferable to be 0.1% by mass or more and 3% by mass or less.

The lubricating oil composition for a compression refrigerator of the invention only has to contain the organic compound having a double bond in the molecule, and, as required, may contain other oxygen scavengers.

<Base Oil>

The base oil in the invention preferably contains at least one kind selected among polyoxyalkylene glycols, polyvinyl ethers, copolymers of poly(oxy)alkylene glycol or a monoether thereof and polyvinyl ether, polyol esters and polycarbonates as a main component.

[Polyoxyalkylene Glycols]

As the polyoxyalkylene glycols usable as the base oil, compounds represented by a formula (I), for example, can be cited.

$$R^1—[(OR^2)_m—OR^3]_n \qquad (1)$$

(In the formula, $R^1$ represents a hydrogen atom, a $C_1$ to $C_{10}$ monovalent hydrocarbon group, a $C_2$ to $C_{10}$ acyl group, a $C_1$ to $C_{10}$ hydrocarbon group having 2 to 6 binding sites or a $C_1$ to $C_{10}$ oxygen-containing hydrocarbon group, $R^2$ represents a $C_2$ to $C_4$ alkylene group, $R^3$ represents a hydrogen atom, a $C_1$ to $C_{10}$ hydrocarbon group or a $C_2$ to $C_{10}$ acyl group or a $C_1$ to $C_{10}$ oxygen-containing hydrocarbon group, n represents an integer of 1 to 6, and m represents a number where an average value of m×n becomes 6 to 80.)

In the above formula (I), a $C_1$ to $C_{10}$ monovalent hydrocarbon group in each of $R^1$ and $R^3$ may be linear chained, branched or cyclic. The hydrocarbon group is preferably an alkyl group, and, specific examples thereof include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the number of carbon atoms of the alkyl group exceeds 10, the compatibility with the refrigerant is deteriorated and, in some cases, a phase separation is induced. The preferable number of carbon atoms of the alkyl group is 1 to 6.

Further, in each of $R^1$ and $R^3$, a hydrocarbon group moiety of a $C_2$ to $C_{10}$ acyl group may be linear chained, branched, or cyclic. A hydrocarbon group moiety of the acyl group is preferably an alkyl group, and, as a specific example thereof, various $C_1$ to $C_9$ groups cited as specific examples of the alkyl groups can be similarly cited. When the number of carbon atoms of the acyl group exceeds 10, the compatibility with a refrigerant is deteriorated, and, in some cases, the phase separation is induced. The number of carbon atoms of an acyl group is preferably 2 to 6.

When both $R^1$ and $R^3$ are a hydrocarbon group or an acyl group, $R^1$ and $R^3$ may be the same with or different from each other.

Further, when n is 2 or more, a plurality of $R^3$'s in one molecule may be the same with or different from each other.

When $R^1$ is a $C_1$ to $C_{10}$ hydrocarbon group having 2 to 6 binding sites, the hydrocarbon group may be straight chained or branched. As a hydrocarbon group having two binding sites, aliphatic hydrocarbon groups are preferred, and examples thereof include an ethylene group, a propylene group, a butylene group, a pentylene group, a hexylene group, a heptylene group, an octylene group, a nonylene group, a decylene group, a cyclopentylene group, and a cyclohexylene group. Examples of other hydrocarbon groups include residues obtained by removing a hydroxyl group from bisphenols such as biphenol, bisphenol F, or bisphenol A. Further, as the hydrocarbon group having 3 to 6 binding sites, aliphatic hydrocarbon groups are preferred, and examples thereof include residues obtained by removing a hydroxyl group from polyhydric alcohols such as trimethylol propane, glycerin, pentaerythritol, sorbitol, 1,2,3-trihydroxy cyclohexane, and 1,3,5-trihydroxy cyclohexane.

When the number of carbon atoms of the aliphatic hydrocarbon group exceeds 10, the compatibility with the refrigerant is deteriorated and, in some cases, a phase separation is induced. The preferable number of carbon atoms is 2 to 6.

Further, as the $C_1$ to $C_{10}$ oxygen-containing hydrocarbon group in each of $R^1$ and $R^3$, chained aliphatic groups and cyclic aliphatic groups, which have an ether bond can be cited. However, a tetrahydrofurfuryl group is particularly preferred.

In the invention, at least one of the $R^1$ and $R^3$ is preferred to be an alkyl group, particularly, a $C_1$ to $C_3$ alkyl group, and especially, a methyl group, from the viewpoint of the viscosity characteristics. Further, from the same reason, both of $R^1$ and $R^3$ are preferred to be an alkyl group, particularly, a methyl group.

$R^2$ in the formula (I) is a $C_2$ to $C_4$ alkylene group, and, as an oxyalkylene group of a repeating unit, an oxyethylene group, an oxypropylene group, and an oxybutylene group can be cited. In one molecule, the oxyalkylene groups may be the same, or, two or more kinds of oxyalkylene groups may be contained. However, in one molecule, at least an oxypropylene unit is preferably contained, in particular, in an oxyalkylene unit, 50% by mol or more of the oxypropylene unit is preferably contained.

In the formula (I), n represents an integer of 1 to 6, and this is determined according to the number of binding sites of $R^1$. When $R^1$ represents an alkyl group or an acyl group, for example, n is 1. When $R^1$ is an aliphatic hydrocarbon group having two, three, four, five and six binding sites, respectively, n represents 2,3,4,5 and 6, respectively. Further, m represents the number where an average value of m×n is 6 to 80. When the average value exceeds 80, the compatibility is deteriorated and the oil returnability is damaged. That is, when the average value of m×n deviates from the range thereof, the object of the invention may not be sufficiently achieved.

The polyoxyalkylene glycols represented by the formula (I) include polyoxyalkylene glycol having a hydroxyl group at a terminal thereof, and, when the content of the hydroxyl groups is at a ratio of 50% by mole or less with respect to an entirety of terminal groups, even when contained, the polyoxyalkylene glycol can be preferably used. When the content of the hydroxyl groups exceeds 50% by mole, a hygroscopic property increases to unfavorably deteriorate the viscosity index. When the polyoxyalkylene glycol is used together with an unsaturated fluorinated hydrocarbon refrigerant described below, the refrigerant has an olefin structure and is poor in the stability. Accordingly, the base oil preferably has the hydroxyl group value of 5 mgKOH/g or less, more preferably 3 mgKOH/g or less, and particularly preferably 1 mgKOH/g or less.

Further, from the viewpoint of stability of the base oil, it is preferable that the ASTM color is 1 or less and the ash content is 0.1% by mass or less.

As such polyoxyalkylene glycols, polyoxypropylene glycol dimethyl ether represented by a formula (I-a)

[Chemical Formula 1]

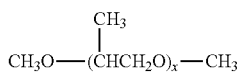
(I-a)

(In the formula, x represents an integer of 6 to 80), polyoxyethylene polyoxypropylene glycol dimethyl ether represented by a formula (I-b)

[Chemical Formula 2]

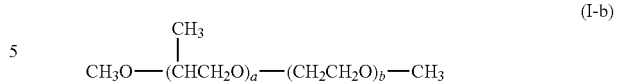
(I-b)

(In the formula, a and b each represents an integer of 1 or more and a sum total of which is 6 to 80), and polyoxypropylene glycol monobutyl ether represented by a formula (I-c)

[Chemical Formula 3]

(I-c)

(In the formula, x represents an integer of 6 to 80), and polyoxypropylene glycol diacetate are preferable from the viewpoint of economic efficiency and advantage.

As the polyoxyalkylene glycols represented by the formula (I), all of what was described in detail in JP 2-305893 A can be used.

In the invention, the polyoxyalkylene glycols may be used singularly or in a combination of two or more kinds thereof.

The polyoxyalkylene glycol derivative can be obtained in such a manner that $C_2$ to $C_4$ alkylene oxide such as ethylene oxide or propylene oxide is polymerized with water or alkali hydroxide as an initiator to obtain polyoxyalkylene glycol having a hydroxyl group at each of both terminals, thereafter, both ends of the hydroxyl groups are etherized or esterized with alkyl halide or acyl halide.

Further, the polyoxyalkylene glycol derivative can be manufactured also in such a manner that, with monovalent $C_1$ to $C_{10}$ alcohol or an alkali metal salt thereof as an initiator, $C_2$ to $C_4$ alkylene oxide is polymerized to obtain polyoxyalkylene glycol monoalkyl ether having an ether bond at one terminal and a hydroxyl group at the other terminal, thereafter, the hydroxyl group is etherized or esterized. When a compound of which n in the formula (I) is 2 or more is manufactured, in place of monovalent alcohol, di- to hexa-valent polyhydric alcohol may be used as an initiator.

When a polyoxyalkylene glycol derivative is manufactured according to a method like this, in a ratio between polyoxyalkylene glycol and the like and alkyl halide or acyl halide in an etherification or esterification reaction, when an amount of alkyl halide or acyl halide is less than a stoichiometric amount, hydroxyl groups remain to increase the hydroxyl group value. Accordingly, a molar ratio between polyoxyalkylene glycol and the like and alkyl halide or acyl halide is desirably set optimum. Further, when the polymerization, etherification or esterification reaction is conducted under an inert gas atmosphere, coloration can be suppressed.

[Polyvinyl Ethers]

In the lubricating oil composition for a compression refrigerator of the invention, the polyvinyl ethers that can be used as a base oil contain a polyvinyl compound having a constituent unit represented by a formula (II)

[Chemical Formula 4]

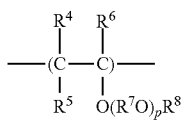
(II)

as a main component.

In the formula (II), $R^4$, $R^5$ and $R^6$ respectively represent a hydrogen atom or a $C_1$ to $C_8$ hydrocarbon group, and these may be the same with or different from each other. Here, specific examples of the hydrocarbon groups include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methyl cyclohexyl groups, various ethyl cyclohexyl groups, and various dimethyl cyclohexyl groups; aryl groups such as a phenyl group, various methyl phenyl groups, various ethyl phenyl groups, and various dimethyl phenyl groups; and aryl alkyl groups such as a benzyl group, various phenylethyl groups, and various methyl benzyl groups. These $R^4$, $R^5$ and $R^6$ are particularly preferable to be a hydrogen atom or a hydrocarbon group having three or less carbon atoms.

On the other hand, $R^7$ in the formula (II) represents a $C_2$ to $C_{10}$ divalent hydrocarbon group. Specific examples of the $C_2$ to $C_{10}$ divalent hydrocarbon groups include: divalent aliphatic groups such as an ethylene group, a phenylethylene group, 1,2-propylene group, a 2-phenyl-1,2-propylene group, a 1,3-propylene group, various butylene groups, various pentylene groups, various hexylene groups, various heptylene groups, various octylene groups, various nonylene groups and various decylene groups; alicyclic groups having two binding sites on alicyclic hydrocarbon such as cyclohexane, methylcyclohexane, ethylcyclohexane, dimethylcyclohexane, and propylcyclohexane; divalent aromatic hydrocarbon groups such as various phenylene groups, various methylphenylene groups, various ethylphenylene groups, various dimethylphenylene groups, and various naphthylenes; alkyl aromatic groups having a monovalent binding site on each of an alkyl group moiety and an aromatic moiety of alkyl aromatic hydrocarbon such as toluene and ethyl benzene; and alkyl aromatic groups having a binding site on an alkyl group moiety of polyalkyl aromatic hydrocarbon such as xylene, and diethyl benzene. Among these, $C_2$ to $C_4$ aliphatic groups are particularly preferred. A plurality of $R^7O$'s may be the same with or different from each other.

In the formula (II), p represents the number of repetition, and an average value thereof is an integer in the range of 0 to 10, preferably 0 to 5.

Further, $R^8$ in the formula (II) represents a $C_1$ to $C_{10}$ hydrocarbon group. Specific examples of the hydrocarbon groups include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methyl phenyl groups, various ethyl phenyl groups, various dimethyl phenyl groups, various propyl phenyl groups, various trimethyl phenyl groups, various butyl phenyl groups, and various naphthyl groups; and aryl alkyl groups such as a benzyl group, various phenylethyl groups, various methyl benzyl groups, various phenylpropyl groups, and various phenylbutyl groups. Among these, hydrocarbon groups having 8 or less carbon atoms are preferred, when p is 0, $C_1$ to $C_6$ alkyl groups are preferred, and when p is 1 or more, $C_1$ to $C_4$ alkyl groups are particularly preferred.

The polyvinyl ether-based compound of the invention can be manufactured by polymerizing a corresponding vinyl ether monomer. The vinyl ether monomer that can be used here is represented by a formula (III)

[Chemical Formula 5]

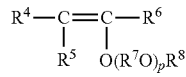
(III)

(In the formula, $R^4$, $R^5$, $R^6$, $R^7$, $R^8$ and p are the same as those described above.) As the vinyl ether monomer, various kinds corresponding to the polyvinyl ether-based compounds can be cited. Examples thereof include vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-propyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. These vinyl ether-based monomers can be manufactured according to any known methods.

The terminals of the polyvinyl ether-based compound having the constitutional unit represented by the formula (II) used as a main component of the lubricating oil composition for a compression refrigerator of the invention can be converted to a desired structure by a method in this application and a known method. As a group to be converted, a saturated hydrocarbon group, an ether group, an alcohol group, a ketone group, an amide group, and a nitrile group can be cited.

As the polyvinyl ether-based compound that can be used as a base oil in the lubricating oil composition for a compression refrigerator of the invention, a compound having the following terminal structure is suitable. That is, the polyvinyl ether-based compound has:
(1) a structure in which one of the terminals is represented by the following general formula (IV),

[Chemical Formula 6]

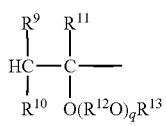

(IV)

(In the formula, $R^9$, $R^{10}$, and $R^{11}$ each represent a hydrogen atom, or a $C_1$ to $C_8$ hydrocarbon group and may be the same with or different from each other, $R^{12}$ represents a $C_2$ to $C_{10}$ divalent hydrocarbon group, $R^{13}$ represents a $C_1$ to $C_{10}$ hydrocarbon group, q represents an integer of which an average value is 0 to 10, and in the case where multiple $R^{12}O$'s are present, multiple $R^{12}O$'s may be the same with or different from each other), and the other terminal is represented by the following formula (V),

[Chemical Formula 7]

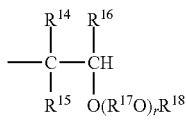

(V)

(In the formula, $R^{14}$, $R^{15}$, and $R^{16}$ each represent a hydrogen atom, or a $C_1$ to $C_8$ hydrocarbon group and may be the same with or different from each other, $R^{17}$ represents a $C_2$ to $C_{10}$ divalent hydrocarbon group, $R^{18}$ represents a $C_1$ to $C_{10}$ hydrocarbon group, r represents an integer of which an average value is 0 to 10, and when multiple $R^{17}O$'s are present, multiple $R^{17}O$'s may be the same with or different from each other);
(2) a structure in which one of the terminals is represented by the formula (IV) and the other terminal is represented by the following formula (VI),

[Chemical Formula 8]

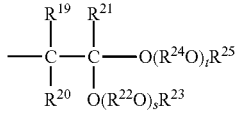

(VI)

(In the formula, R19, $R^{20}$, and $R^{21}$ each represent a hydrogen atom, or a $C_1$ to $C_8$ hydrocarbon group and may be the same with or different from each other, $R^{22}$ and $R^{24}$ each represent a $C_2$ to $C_{10}$ divalent hydrocarbon group and may be the same with or different from each other, $R^{23}$ and $R^{25}$ each represent a $C_1$ to $C_{10}$ hydrocarbon group and may be the same with or different from each other, s and t each represent such an integer of which an average value is 0 to 10 and my be the same with or different from each other, when multiple $R^{22}O$'s are present, multiple $R^{22}O$'s may be the same with or different from each other, and when multiple $R^{24}O$'s are present, multiple $R^{24}O$'s may be the same with or different from each other);

(3) a structure in which one of the terminals is represented by the formula (IV) and the other terminal has an olefinic unsaturated bond; or
(4) a structure in which one of the terminals is represented by the formula (IV) and the other terminal is represented by the following formula (VII),

[Chemical Formula 9]

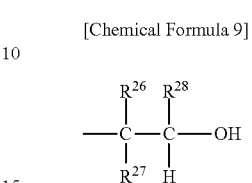

(VII)

(In the formula, $R^{26}$, $R^{27}$, and $R^{28}$ each represent a hydrogen atom, or a $C_1$ to $C_8$ hydrocarbon group and may be the same with or different from each other.)

The polyvinyl ether-based mixture may be a mixture including two or more kinds of the polyvinyl ether-based compounds selected from those having the terminal structures described in the (1) to (4). As such the mixture, for example, a mixture of the compounds in the (1) and (4) and a mixture of the compounds in the (2) and (3) can be preferably cited.

When the polyvinyl ether-based compound is used in combination with an unsaturated fluorinated hydrocarbon refrigerant described below, since the refrigerant has an olefinic structure and is poor in the stability, the hydroxyl group value of a base oil is preferred to be 17 mgKOH/g or less, more preferred to be 15 mgKOH/g or less, and particularly preferred to be 10 mgKOH/g or less.

As the polyvinyl ether-based compound, in order to generate a polyvinyl ether-based compound having a preferable viscosity range, the raw material, initiator and reaction condition are preferably selected. Even a polymer outside the range of kinematic viscosity, when mixed with a polymer having other kinematic viscosity, can be adjusted to the viscosity within the range of kinematic viscosity.

In the invention, the polyvinyl ether-based compounds may be used singularly or in a combination of two or more kinds thereof.

[Copolymer of Poly(oxy)alkylene Glycol or Monoether thereof and Polyvinyl Ether]

It should be noted that the poly(oxy)alkylene glycol refers to both polyalkylene glycol and polyoxyalkylene glycol.

In the lubricating oil composition for a compression refrigerator of the invention, as a copolymer of poly(oxy)alkylene glycol or a monoether thereof and polyvinyl ether, which can be used as a base oil, copolymers (Hereinafter, respectively referred to as polyvinyl ether-based copolymer I and polyvinyl ether-based copolymer II) represented by the following formula (VIII) and the following formula (IX) can be cited.

[Chemical Formula 10]

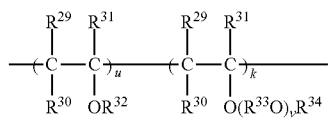

(VIII)

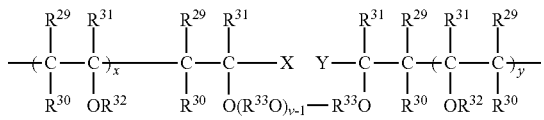

(IX)

In the formula (VIII), $R^{29}$, $R^{30}$, and $R^{31}$ each represent a hydrogen atom, or a $C_1$ to $C_8$ hydrocarbon group and may be the same with or different from each other, $R^{33}$ represents a $C_2$ to $C_4$ divalent hydrocarbon group, $R^{34}$ represents a $C_1$ to $C_{20}$ aliphatic or alicyclic hydrocarbon group, a $C_1$ to $C_{20}$ aromatic group that may have a substituent, a $C_2$ to $C_{20}$ acyl group, or a $C_2$ to $C_{50}$ oxygen-containing hydrocarbon group, $R^{32}$ represents a $C_1$ to $C_{10}$ hydrocarbon group, and when multiple $R^{34}$'s, $R^{33}$'s, and $R^{32}$'s are present, multiple $R^{34}$'s, $R^{33}$'s, and $R^{32}$'s may be the same with or different from each other.

Here, specific examples of the $C_1$ to $C_8$ hydrocarbon groups represented by any one of $R^{29}$ to $R^{31}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; aryl groups such as a cyclopentyl group, a cyclohexyl group, various methyl cyclohexyl groups, various ethyl cyclohexyl groups, various dimethyl cyclohexyl groups, and various dimethyl phenyl groups; and aryl alkyl groups such as a benzyl group, various phenyl ethyl groups, and various methyl benzyl groups. It should be noted that $R^{29}$, $R^{30}$, and $R^{31}$ each particularly preferably represent a hydrogen atom.

On the other hand, specific examples of the $C_2$ to $C_4$ divalent hydrocarbon group represented by $R^{33}$ include divalent alkylene groups such as a methylene group, an ethylene group, a propylene group, a trimethylene group, and various butylene groups.

It should be noted that v in the formula (VIII) represents the number of the repeating of $R^{33}O$ and an average value thereof is an integer in the range of 1 to 50, preferably 1 to 20, more preferably 1 to 10, or particularly preferably 1 to 5. When multiple $R^{33}O$'s are present, multiple $R^{33}O$'s may be the same with or different from each other.

In addition, k represents an integer in the range of 1 to 50, preferably 1 to 10, more preferably 1 to 2, or particularly preferably 1, and u represents an integer in the range of 0 to 50, preferably 2 to 25, and more preferably 5 to 15. When multiple k's and u's are present, the polymer may be a block polymer or a random polymer.

Further, $R^{34}$ in the formula (VIII) preferably represents a $C_1$ to $C_{10}$ alkyl group, a $C_2$ to $C_{10}$ acyl group, or a $C_2$ to $C_{50}$ oxygen-containing hydrocarbon group.

Specific examples of the $C_1$ to $C_{10}$ alkyl groups include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methyl cyclohexyl groups, various ethyl cyclohexyl groups, various propyl cyclohexyl groups, and various dimethyl cyclohexyl groups.

In addition, as the $C_2$ to $C_{10}$ acyl group, an acetyl group, a propionyl group, a butyryl group, an isobutyryl group, a valeryl group, an isovaleryl group, a pivaloyl group, a benzoyl group, and a toluoyl group can be cited.

Further, specific examples of the $C_2$ to $C_{50}$ oxygen-containing hydrocarbon groups preferably include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

In the formula (VIII), specific examples of the $C_1$ to $C_{10}$ hydrocarbon groups represented by $R^{32}$ include: alkyl groups such as a methyl group, an ethyl group, an n-propyl group, an isopropyl group, an n-butyl group, an isobutyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methyl phenyl groups, various ethyl phenyl groups, various dimethyl phenyl groups, various propyl phenyl groups, various trimethyl phenyl groups, various butyl phenyl groups, and various naphthyl groups; and aryl alkyl groups such as a benzyl group, various phenylethyl groups, various methylbenzyl groups, various phenylpropyl groups, and various phenylbutyl groups.

It should be noted that $R^{29}$ to $R^{31}$, $R^{34}$, $R^{33}$, and v, and $R^{29}$ to $R^{32}$ may be the same with or different from each other among constitutional units.

The polyvinyl ether-based copolymer I having the constitutional unit represented by the formula (VIII) has an effect of improving the lubricity, insulating property, and hygroscopic property while satisfying the compatibility by forming into a copolymer. In this case, the properties of the lubricant can be adjusted to the intended level by selecting the kind of the monomer as a raw material, the kind of the initiator, and the rate of the copolymer. Therefore, the polyvinyl ether-based copolymer I has an effect that a lubricant according to requirements of the type of a compressor in a refrigerating system or a conditioner system, and the lubricity, the compatibility, and the like, which are different according to the material of a lubricating part, refrigerating capacity, the kind of the refrigerant, and the like, can be obtained freely.

On the other hand, in the polyvinyl ether-based copolymer II represented by the formula (IX), $R^{29}$ to $R^{32}$, $R^{33}$, and v each have the same meaning as that described above. When multiple $R^{33}$'s and $R^{32}$'s are present, each of $R^{33}$'s and $R^{32}$'s may be the same with or different from each other. x and y each represent an integer of 1 to 50. When multiple x's and y's are present, the copolymer may have a block polymer structure or a random polymer structure. X and Y each independently represent a hydrogen atom, a hydroxyl group, or a $C_1$ to $C_{20}$ hydrocarbon group.

A manufacturing method of the polyvinyl ether-based copolymer I represented by the formula (VIII) is not particularly limited as long as the polyvinyl ether-based copolymer I can be obtained. For example, the polyvinyl ether-based copolymer I can be manufactured by the following manufacturing methods 1 to 3.

(Manufacturing Method 1 of Polyvinyl Ether-Based Copolymer I)

In the manufacturing method 1, a poly(oxy)alkylene glycol compound represented by the following formula (X), $$R^{34}\text{---}(OR^{33})_v\text{---}OH \qquad (X)$$

(In the formula, $R^{33}$ and $R^{34}$, and v each have the same meaning as that described above.) is used as an initiator, and a vinyl ether-based compound represented by the following formula (XI),

[Chemical Formula 11]

(XI)

(In the formula, $R^{29}$ to $R^{32}$ each have the same meaning as that described above.), is polymerized, whereby the polyvinyl ether-based copolymer I can be obtained.

Examples of poly(oxy)alkylene glycol compounds represented by the formula (X) include (oxy)alkylene glycol monoethers such as ethylene glycol monomethyl ether, diethylene glycol monomethyl ether, triethylene glycol monomethyl ether, propylene glycol monomethyl ether, dipropylene glycol monomethyl ether, and tripropylene glycol monomethyl ether.

Further, examples of the vinyl ether-based compounds represented by the formula (XI) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, and vinyl-n-hexyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, and 2-tert-butoxy-2-butene. These vinyl ether-based monomers can be manufactured by any known methods.

(Manufacturing Method 2 of Polyvinyl Ether-Based Copolymer I)

In the manufacturing method 2, an acetal compound represented by the following formula (XII),

[Chemical Formula 12]

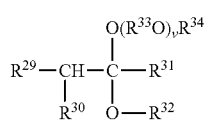

(XII)

(In the formula, $R^{29}$ to $R^{34}$, and v each have the same meaning as that described above) is used as an initiator, and the vinyl ether-based compound represented by the formula (XI) is polymerized, whereby the polyvinyl ether-based copolymer I can be obtained.

Examples of the acetal compounds represented by the formula (XII) include acetaldehyde methyl(2-methoxyethyl) acetal, acetaldehyde ethyl(2-methoxyethyl)acetal, acetaldehyde methyl(2-methoxy-1-methylethyl)acetal, acetaldehyde ethyl(2-methoxy-1-methylethyl)acetal, acetaldehyde methyl [2-(2-methoxyethoxy)ethyl]acetal, acetaldehyde ethyl[2-(2-methoxyethoxy)ethyl]acetal, acetaldehyde methyl[2-(2-methoxyethoxy)-1-methylethyl]acetal, and acetaldehyde ethyl[2-(2-methoxyethoxy)-1-methylethyl]acetal.

In addition, the acetal compound represented by the formula (XII) can be manufactured by reacting one molecule of the poly(oxy)alkylene glycol compound represented by the formula (X) with one molecule of the vinyl ether-based compound represented by the formula (XI). The obtained acetal compound is used as an initiator after being isolated or as it is.

(Manufacturing Method 3 of Polyvinyl Ether-Based Copolymer I)

In the manufacturing method 3, an acetal compound represented by the following formula (XIII),

[Chemical Formula 13]

(XIII)

(In the formula, $R^{29}$ to $R^{31}$, $R^{33}$, $R^{34}$ and v have the same meaning as that described above) is used as an initiator, and the vinyl ether-based compound represented by the formula (XI) is polymerized, whereby a polyvinyl ether-based copolymer I can be obtained.

Examples of the acetal compounds represented by the formula (XIII) include acetaldehyde di(2-methoxyethyl)acetal, acetaldehyde di(2-methoxy-1-methylethyl)acetal, acetaldehyde di[2-(2-methoxyethoxy)ethyl]acetal, and acetaldehyde di[2-(2-methoxyethoxy)-1-methylethyl]acetal.

In addition, the acetal compound represented by the formula (XIII) can be also manufactured by reacting one molecule of the poly(oxy)alkylene glycol compound represented by the formula (X) with one molecule of a vinyl ether-based compound represented by the following formula (XIV),

[Chemical Formula 14]

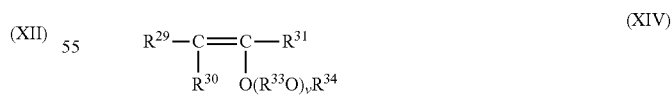

(XIV)

(In the formula, $R^{29}$ to $R^{31}$, $R^{33}$, $R^{34}$ and v have the same meaning as that described above). The obtained acetal compound may be used as an initiator after being isolated or as it is.

The vinyl ether-based copolymer I represented by the formula (VIII) can be formed into a vinyl ether-based copolymer I having a structure in which one of the terminals is represented by the following formula (XV) or (XVI),

[Chemical Formula 15]

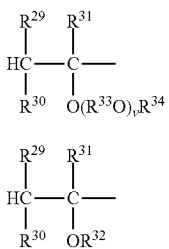

(XV)

(XVI)

(In the formula, $R^{29}$ to $R^{34}$ and v have the same meaning as that described above), and the other terminal thereof is represented by the following formula (XVII) or (XVIII),

[Chemical Formula 16]

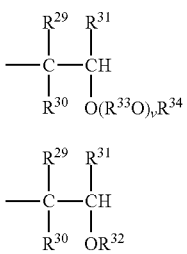

(XVII)

(XVIII)

(In the formula, $R^{29}$ to $R^{34}$ and v have the same meaning as that described above).

Of these polyvinyl ether-based copolymers I, the followings are particularly suitable for the base oil in a lubricating oil composition for a compression refrigerator of the invention.

(1) A substance having a structure in which one of the terminals is represented by the formula (XV) or (XVI), and the other terminal is represented by the formula (XVII) or (XVIII), and in the formula (VIII), $R^{29}$, $R^{30}$, and $R^{31}$ each represent a hydrogen atom, v represents an integer in the range of 1 to 4, $R^{33}$ represents a $C_2$ to $C_4$ divalent hydrocarbon group, $R^{34}$ represents a $C_1$ to $C_{10}$ alkyl group, and $R^{32}$ represents a $C_1$ to $C_{10}$ hydrocarbon group.

(2) A substance having a structure in which one of the terminals is represented by the formula (XV), and the other terminal is represented by the formula (XVIII), and in the formula (VIII), $R^{29}$, $R^{30}$, and $R^{31}$ each represent a hydrogen atom, v represents an integer in the range of 1 to 4, $R^{33}$ represents a $C_2$ to $C_4$ divalent hydrocarbon group, $R^{34}$ represents a $C_1$ to $C_{10}$ alkyl group, and $R^{32}$ represents a $C_1$ to $C_{10}$ hydrocarbon group.

(3) A substance having a structure in which one of the terminals is represented by the formula (XVI), and the other terminal is represented by the formula (XVII), and in the formula (VIII), $R^{29}$, $R^{30}$, and $R^{33}$ each represent a hydrogen atom, v represents an integer in the range of 1 to 4, $R^{33}$ represents a $C_2$ to $C_4$ divalent hydrocarbon group, $R^{34}$ represents a $C_1$ to $C_{10}$ alkyl group, and $R^{32}$ represents a $C_1$ to $C_{10}$ hydrocarbon group.

On the other hand, a manufacturing method of the polyvinyl ether-based copolymer II represented by the formula (IX) is not particularly limited as long as the polyvinyl ether-based copolymer II can be obtained, and the polyvinyl ether-based copolymer II can be manufactured efficiently by the following method.

(Manufacturing Method of Polyvinyl Ether-Based Copolymer II)

The polyvinyl ether-based copolymer II represented by the formula (IX) can be obtained by using poly(oxy)alkylene glycol represented by the following formula (XIX)

$$HO-(R^{33}O)_v-H \qquad (XIX)$$

(In the formula, $R^{33}$ and v each have the same meaning as that described above) as an initiator, and by polymerizing the vinyl ether compound represented by the formula (XI).

Examples of the poly(oxy)alkylene glycol represented by the formula (XIX) include ethylene glycol, diethylene glycol, triethylene glycol, polyethylene glycol, propylene glycol, dipropylene glycol, and polypropylene glycol.

When the polyvinyl ether-based compound is used in combination with an unsaturated fluorinated hydrocarbon refrigerant described below, since the refrigerant has an olefinic structure and is poor in the stability, the hydroxyl group value of a base oil is preferred to be 15 mgKOH/g or less.

In the present invention, the copolymers of the poly(oxy)alkylene glycols or monoether thereof and polyvinyl ethers may be used singularly or in a combination of two or more kinds thereof.

[Polyol Esters]

In the lubricating oil composition for a compression refrigerator of the invention, as the polyol esters to be used as the base oil, esters of a diol or a polyol having about 3 to 20 hydroxyl groups and an aliphatic acid having about 1 to 24 carbon atoms are preferably used.

Here, examples of the diols include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol.

Examples of the polyols include: polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (dimer to 20-mer of glycerin), 1,3,5-pentanetriol, sorbitol, sorbitan, a sorbitol glycerin condensate, adonitol, arabitol, xylitol, and mannitol; saccharides such as xylose, arabinose, ribose, rhamnose, glucose, fructose, galactose, mannose, sorbose, cellobiose, maltose, isomaltose, trehalose, sucrose, raffinose, gentianose, and merenditose; and partially etherified products and methyl glucosides(glucosides). Of these, a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferred as a polyol.

The aliphatic acid may have any number of carbon atoms without any particular limitation; a $C_1$ to $C_{24}$ aliphatic acid is typically used. Of the $C_1$ to $C_{24}$ aliphatic acids, an aliphatic acid having 3 or more carbon atoms is preferred, an aliphatic acid having 4 or more carbon atoms is more preferred, an aliphatic acid having 5 or more carbon atoms is still more preferred, and an aliphatic acid having 10 or more carbon atoms is most preferred in terms of lubricity. In addition, an aliphatic acid having 18 or less carbon atoms is preferred, an aliphatic acid having 12 or less carbon atoms is more preferred, and an aliphatic acid having 9 or less carbon atoms is still more preferred in terms of compatibility with the refrigerant.

In addition, the aliphatic acid may be a straight chained aliphatic acid or a branched aliphatic acid; the aliphatic acid is preferably a straight chained aliphatic acid in terms of lubricity, or is preferably a branched aliphatic acid in terms of hydrolytic stability. Further, the aliphatic acid may be a saturated aliphatic acid or an unsaturated aliphatic acid.

Specific examples of the aliphatic acids include: straight chained or branched pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid; or a neoic acid of which the α-carbon atom is quaternary. More specifically, valeric(n-pentanoic) acid, caproic(n-hexanoic) acid, enanthic(n-heptanoic) acid, caprylic(n-octanoic) acid, pelargonic(n-nonanoic) acid, capric(n-decanoic) acid, oleic(cis-9-octadecenoic) acid, isopentanoic(3-methylbutanoic) acid, 2-methylhexanoic acid, 2-ethylpentanoic acid, 2-ethylhexanoic acid, and 3,5,5-trimethylhexanoic acid are preferred.

It should be noted that the polyol ester may be a partial ester in which some of the hydroxyl groups of a polyol remain without being esterified, may be a complete ester in which all of the hydroxyl groups of the polyol are esterified, or may be a mixture of a partial ester and a complete ester; the polyol ester is preferably a complete ester.

Of the polyol esters, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is more preferred, and an ester of neopentyl glycol, trimethylolethane, trimethylolpropane, trimethylolbutane, or pentaerythritol is still more preferred because such ester is additionally excellent in hydrolytic stability. An ester of pentaerythritol is most preferred because the ester is particularly excellent in compatibility with the refrigerant and hydrolytic stability.

Specific examples of the preferred polyol esters include: a diester formed of neopentyl glycol and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol ethane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol propane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylol butane and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester formed of pentaerythritol and one kind or two or more kinds of aliphatic acids selected from valeric acid, caproic acid, enanthic acid, caprylic acid, pelargoic acid, capric acid, oleic acid, isopentanoic acid, 2-methylhexanoic acid, 2-ethylpentanoic acid, 2-ethylhexanoic acid, and 3,5,5-trimethylhexanoic acid.

It should be noted that the esters with two or more kinds of aliphatic acids may be a mixture of two or more kinds of esters formed of one kind of aliphatic acid and a polyol. An ester formed of two or more kinds of mixed aliphatic acids and a polyol, particularly an ester formed of mixed aliphatic acids and a polyol is excellent in low temperature properties and compatibility with a refrigerant.

When the polyol ester is used together with an unsaturated fluorinated hydrocarbon refrigerant described below, the refrigerant has an olefin structure and is poor in the stability. Accordingly, the base oil preferably has an acid value of 0.02 mgKOH/g or less and a hydroxyl group value of 5 mgKOH/g or less. The acid value is more preferably 0.01 mgKOH/g or less, and the hydroxyl group value is more preferably 3 mgKOH/g or less.

It is also preferred that the base oil has an ASTM color of 1 or less, a surface tension of 20 mN/m or more, a pH of extracted water of 5.5 or more, an ash content of 0.1% by mass or less, and a volume resistivity of $10^9$ Ωm or more. The base oil having characteristics like this is preferred because the stability is excellent and electric insulating property is excellent.

When the polyol ester-based compound is manufactured by esterifying under an inert gas atmosphere, the compound can be prevented from being colored. Further, in a ratio of polyhydric alcohol and aliphatic monocarboxylic acid, which are reacted, when an amount of aliphatic monocarboxylic acid is stoichiometrically less contained, hydroxyl groups partially remain to raise the hydroxyl group value, on the other hand, when an amount of aliphatic monocarboxylic acid is stoichiometrically much contained, carboxylic acid partially remains to raise the acid value and reduce the pH of the extracted water. Accordingly, it is desirable that a molar ratio of polyhydric alcohol and aliphatic monocarboxylic acid is optimized, and, an amount of the remaining esterification catalyst (ash content) is made as small as possible.

[Polycarbonates]

As the polycarbonates which can be used as the base oil in the lubricating oil composition for a compression refrigerator of the invention, at least one kind selected from polycarbonates each having two or more carbonate bonds in one molecule, that is: compounds each represented by the following formula (XX),

[Chemical Formula 17]

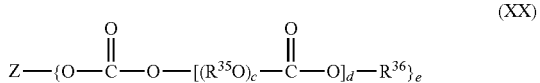
(XX)

(In the formula, Z represents a residue obtained by removing a hydroxyl group from a $C_1$ to $C_{12}$ e-valent alcohol; $R^{35}$ represents a $C_2$ to $C_{10}$ straight chained or branched alkylene group; $R^{36}$ represents a $C_1$ to $C_{12}$ monovalent hydrocarbon group or a group containing an ether bond represented by $R^{38}(O-R^{37})_f-$ (where $R^{38}$ represents a hydrogen atom or a $C_1$ to $C_{12}$ monovalent hydrocarbon group, $R^{37}$ represents a $C_2$ to $C_{10}$ straight chained or branched alkylene group, and f represents an integer of 1 to 20); c represents an integer of 1 to 30, d represents an integer of 1 to 50; and e represents an integer of 1 to 6); and compounds each represented by the following general formula (XXI),

[Chemical Formula 18]

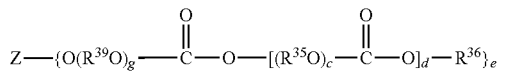
(XXI)

(In the formula, $R^{39}$ represents a $C_2$ to $C_{10}$ straight chained or branched alkylene group; g represents an integer of 1 to 20; and Z, $R^{35}$, $R^{36}$, c, d, and e each have the same meaning as that described above) can be preferably cited.

In each of the formulas (XX) and (XXI), Z, which represents a residue obtained by removing a hydroxyl group from a $C_1$ to $C_{12}$ monovalent to hexavalent alcohol, particularly preferably represents a residue obtained by removing a hydroxyl group from a $C_1$ to $C_{12}$ monovalent alcohol.

Among $C_1$ to $C_{12}$ monovalent to hexavalent alcohols having the residue represented by Z include, examples of the monovalent alcohols include: aliphatic monovalent alcohols such as methyl alcohol, ethyl alcohol, n- or isopropyl alcohol, various butyl alcohols, various pentyl alcohols, various hexyl alcohols, various octyl alcohols, various decyl alcohols, and various dodecyl alcohols; alicyclic monovalent alcohols such as cyclopentyl alcohol and cyclohexyl alcohol; aromatic alcohols such as phenol, cresol, xylenol, butyl phenol, and naphthol; and aromatic aliphatic alcohols such as benzyl alcohol and phenethyl alcohol; examples of the bivalent alcohols include: aliphatic alcohols such as ethylene glycol, propylene glycol, butylene glycol, neopentylene glycol, and tetramethylene glycol; alicyclic alcohols such as cyclohexanediol and cyclohexanedimethanol; and aromatic alcohols such as catechol, resorcinol, hydroquinone, and dihydroxy diphenyl; examples of trivalent alcohols include: aliphatic alcohols such as glycerin, trimethylol propane, trimethylol ethane, trimethylol butane, and 1,3,5-pentanetriol; alicyclic alcohols such as cyclohexanetriol and cyclohexanetrimethanol; and aromatic alcohols such as pyrogallol and methylpyrogallol; and examples of tetravalent to hexavalent alcohols include aliphatic alcohols such as pentaerythritol, diglycerin, triglycerin, sorbitol, and dipentaerythritol.

As such the polycarbonate compounds, as compounds represented by the following formula (XX), compounds represented by a formula (XX-a)

[Chemical Formula 19]

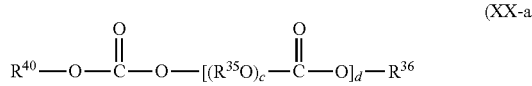
(XX-a)

(In the formula, $R^{40}$ represents a residue obtained by removing a hydroxyl group from a $C_1$ to $C_{12}$ monovalent alcohol, and $R^{35}$, $R^{36}$, c, and d each have the same meaning as that described above), and/or, as compounds represented by a formula (XXI), compounds represented by the following formula (XXI-a),

[Chemical Formula 20]

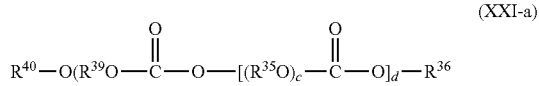
(XXI-a)

(In the formula, $R^{35}$, $R^{36}$, $R^{39}$, $R^{48}$, c, d and g each have the same meaning as that described above) can be cited.

Examples of the residues obtained by removing a hydroxyl group from a $C_1$ to $C_{12}$ monovalent alcohol represented by $R^{40}$ in each of the formulae (XX-a) and (XXI-a) include: aliphatic hydrocarbon groups such as a methyl group, an ethyl group, an n-propyl group, an isopropyl group, various butyl groups, various pentyl groups, various hexyl groups, various octyl groups, various decyl groups, and various dodecyl groups; alicyclic hydrocarbon groups such as a cyclopentyl group, a cyclohexyl group, a methylcyclohexyl group, a dimethylcyclohexyl group, and a decahydronaphthyl group; aromatic hydrocarbon groups such as a phenyl group, various tolyl groups, various xylyl groups, a mesityl group, and various naphthyl groups; and aromatic aliphatic hydrocarbon groups such as a benzyl group, a methylbenzyl group, a phenethyl group, and various naphthylmethyl groups. Of these, a $C_1$ to $C_6$ straight chained or branched alkyl group is preferable.

$R^{35}$, which represents a $C_2$ to $C_{10}$ straight chained or branched alkylene group, preferably represents a $C_2$ to $C_6$ straight chained or branched alkylene group, and particularly preferably represents an ethylene group or a propylene group in terms of, for example, the performance of the compound and the ease with which the compound is produced. Further, $R^{36}$ represents a $C_1$ to $C_{12}$ monovalent hydrocarbon group or a group containing an ether bond represented by $R^{38}$—(O—$R^{37}$)$_f$— (where $R^{38}$ represents a hydrogen atom or a $C_1$ to $C_{12}$ or preferably $C_1$ to $C_6$ monovalent hydrocarbon group, $R^{37}$ represents a $C_2$ to $C_{10}$ straight chained or branched alkylene group, and f represents an integer of 1 to 20), and examples of the above $C_1$ to $C_{12}$ monovalent hydrocarbon groups include examples similar to those described in the description of the $R^{40}$. In addition, a $C_2$ to $C_{10}$ straight chained or branched alkylene group represented by $R^{37}$ is preferably a $C_2$ to $C_6$ straight chained or branched alkylene group, or is particularly preferably an ethylene group and a propylene group by the same reason as that in the case of the $R^{35}$.

$R^{36}$ particularly preferably represents a $C_1$ to $C_6$ straight chained or branched alkyl group.

In the formula (XXI-a), a $C_2$ to $C_{10}$ straight chained or branched alkylene group represented by $R^{39}$ is preferably a $C_2$ to $C_6$ alkylene group, particularly, an ethylene group and a propylene group, in terms of the same reason as that described in the case of the $R^{35}$.

Such the polycarbonate compound can be manufactured by any one of various methods; a target polycarbonate compound can be manufactured by causing a carbonate-formable derivative such as a carbonic acid diester or phosgene and an alkylene glycol or a polyalkylene glycol to react with each other in accordance with a known method.

In the present invention, the polycarbonates may be used singularly or in a combination of two or more kinds thereof.

In the lubricating oil composition for a compression refrigerator of the invention, as a base oil, a substance including, as a main component, at least one kind of oxygen-containing compound selected from the polyoxyalkylene glycols, polyvinyl ethers, copolymers of poly(oxy)alkylene glycol or monoether thereof and polyvinyl ether, polyol esters, and polycarbonates is preferably used. Here, the phrase "including as a main component" refers to including the oxygen-containing compound at a rate of 50% by mass or more. The content of the oxygen-containing compound in the base oil is preferably 70% by mass or more, more preferably 90% by mass or more, and still more preferably 100% by mass.

In the invention, the kinematic viscosity of the base oil at 100° C. is preferably 1 mm²/s or more and 50 mm²/s or less, more preferably 3 mm²/s or more and 40 mm²/s or less, and still more preferably 4 mm²/s or more and 30 mm²/s or less. When the kinematic viscosity is 1 mm²/s or more, favorable lubricity (load capacity resistance) is exhibited and sealing property is good, and when the kinematic viscosity is 50 mm²/s or less, energy saving is also favorable.

In addition, the number average molecular weight of the base oil is preferably 300 or more and 3000 or less, more preferably 500 or more and 3,000 or less, and still more preferably 700 or more and 2,500 or less. The flashing point of the base oil is preferably 150° C. or higher. When the number average molecular weight of the base oil is 300 or more and 3000 or less, desirable performance as the refrigerator oil can be exhibited and the flashing point of the base oil can be set within the range.

In addition, the viscosity index of the base oil of the invention is preferably 60 or more and more preferably 80 or more. However, the upper limit of the viscosity index is about 300 in terms of restriction on manufacture.

When the viscosity index is set to 60 or more, the kinematic viscosity at a high temperature can be prevented from becoming lower.

The viscosity index of the base oil can be measured according to JIS K 2283.

In the invention, when the base oil has the above properties, the lubricating oil composition may include, in addition to the oxygen-containing compound, another base oil at 50% by mass or less, preferably 30% by mass or less, and more preferably 10% by mass or less, and the lubricating oil composition free of another base oil is still more preferred.

As the base oil that can be used together with the oxygen-containing compound, other polyesters, a hydrogenation product of α-olefin oligomer, a mineral oil, an alicyclic hydrocarbon compound, an alkylated aromatic hydrocarbon compound are exemplified.

<Refrigerant>

As the refrigerant to which the lubricating oil composition for a compression refrigerator of the invention is applied, a refrigerant containing a $C_1$ to $C_3$, preferably, $C_1$ to $C_2$ saturated fluorinated hydrocarbon compound (HFC) is used.

Preferable examples of the $C_1$ to $C_3$ saturated fluorinated hydrocarbon compounds include trifluoromethane, difluoromethane, 1,1-difluoroethane, 1,1,1-trifluoroethane, 1,1,2-trifluoroethane, 1,1,1,2-tetrafluoroethane, 1,1,2,2-tetrafluoroethane, 1,1,1,2,2-pentafluoroethane, and 1,1,1,3,3-pentafluoropropane.

These refrigerants may be used singularly or in a combination of two or more kinds thereof.

When difluoromethane (R32), for example, is used as the saturated fluorinated hydrocarbon, the R32 can be preferably used singularly. However, the R32 may be mixed with 1,1,1,2,2-pentafluoroethane (R125), or may be mixed with R125 and 1,1,1,2-tetrafluoroethane (R134a). Examples of the former include R410A, and examples of the latter include R407C.

When a mixture of the R32 and other $C_1$ to $C_3$ saturated fluorinated hydrocarbon compound is used, a ratio of the R32 in an entire refrigerant is preferably 20% by mass or more, more preferably 40% by mass or more, and still more preferably 70% by mass or more.

In addition, the $C_1$ to $C_3$ saturated fluorinated hydrocarbon compound may be used by mixing with a refrigerant other than the to $C_3$ saturated fluorinated hydrocarbon compound. In this case, a mixing ratio of the refrigerant other than the $C_1$ to $C_3$ saturated fluorinated hydrocarbon compound is preferably 30% by mass or less and more preferably 20% by mass or less of an entire refrigerant.

As the refrigerant other than the $C_1$ to $C_3$ saturated fluorinated hydrocarbon compound, carbon dioxide ($CO_2$), low boiling hydrocarbon (HC), ammonia, or at least one kind of fluorine-containing organic compound selected from compounds represented by the following molecular formula (A) can be cited.

$$C_pO_qF_rR_s \qquad (A)$$

(In the formula, P. represents Cl, Br, I or H, p is an integer of 1 to 6, q is an integer of 0 to 2, r is an integer of 1 to 14, and s is an integer of 0 to 13. However, when q is 0, p is an integer of 2 to 6, and one or more carbon-carbon unsaturated bonds are present in one molecule.)

Hereinafter, the refrigerants represented by the molecular formula (A) will be detailed.

The molecular formula (A), which shows the types and the numbers of elements in the molecule, represents fluorine-containing organic compounds where the number p of carbon atoms C is in the range of 1 to 6. The fluorine-containing organic compound having 1 to 6 carbon atoms can have physical and chemical properties such as a boiling point, a freezing point, an evaporative latent heat, which are required for the refrigerant.

In the molecular formula (A), a bonding state of p carbon atoms represented by $C_p$ includes unsaturated bonds such as a carbon-carbon single bond and a carbon-carbon double bond, and a carbon-oxygen double bond. In terms of the stability, the carbon-carbon unsaturated bond is preferable to be a carbon-carbon double bond, and the number thereof, which is typically one or more, is preferred to be one.

In the formula (A), the bond state of q oxygen atoms represented by $O_q$ preferably is oxygen from an ether group, a hydroxyl group, or a carbonyl group. The number of oxygen atoms q may be two, which includes cases in which two ether groups, hydroxyl groups or the like are provided.

In addition, when q in $O_q$ is zero, which means that the molecule does not include oxygen atoms, p falls in the range of 2 to 6, which means that the molecule includes one or more unsaturated bonds such as carbon-carbon double bonds in one molecule. In other words, at least one of the bond states of p carbon atoms represented by $C_p$ needs to be a carbon-carbon unsaturated bond.

Besides, in the formula (A), R represents Cl, Br, I, or H, any of which may be selected. However, R preferably is H on account of less possibility of destroying the ozone layer.

As set forth above, preferable examples of the fluorine-containing organic compounds represented by the molecular formula (A) include an unsaturated fluorinated hydrocarbon compound, a fluorinated ether compound, a fluorinated alcohol compound, and a fluorinated ketone compound.

Hereinafter, these compounds will be described.

[Unsaturated Fluorinated Hydrocarbon Compound]

According to the invention, an example of an unsaturated fluorinated hydrocarbon compound that can be used as a freezer refrigerant, an unsaturated fluorinated hydrocarbon compound represented by, for example, the molecular formula (A) in which R is H, p is an integer of 2 to 6, q is 0, r is an integer of 1 to 12, and s is an integer of 0 to 11 can be cited.

Preferred examples of such unsaturated fluorinated hydrocarbon compounds include $C_2$ to $C_6$ linear-chain or branched chain olefins and fluorides of $C_4$ to $C_6$ ring olefins.

The specific examples thereof include ethylene to which 1 to 3 fluorine atoms are introduced, propene to which 1 to 5 fluorine atoms are introduced, butenes to which 1 to 7 fluorine atoms are introduced, pentenes to which 1 to 9 fluorine atoms are introduced, hexenes to which 1 to 11 fluorine atoms are introduced, cyclobutene to which 1 to 5 fluorine atoms are introduced, cyclopentene to which 1 to 7 fluorine atoms are introduced, and cyclohexene to which 1 to 9 fluorine atoms are introduced.

Among the above unsaturated fluorinated hydrocarbon compounds, $C_2$ to $C_3$ unsaturated fluorinated hydrocarbon compounds are preferred, that is, fluorinated compounds of ethylene such as trifluoroethylene and fluorinated compounds of various propene can be cited, in particular, fluorinated compounds of propene are further preferred. Examples of fluorinated compounds of propene include 3,3,3-trifluoropropene, 1,3,3,3-tetrafluoropropene and 2,3,3,3-tetrafluoropropene. In particular, in terms of low global warming potential, 1,2,3,3,3-pentafluoropropene (HFO1225ye), 1,3,3,3-tetrafluoropropene (HFO1234ze) and 2,3,3,3-tetrafluoropropene (HFO1234yf) are preferred.

In the invention, the unsaturated fluorinated hydrocarbon compounds may be used singularly or in a combination of two or more kinds thereof.

[Fluorinated Ether Compound]

According to the invention, an example of a fluorinated ether compound that can be used as a freezer refrigerant, a fluorinated ether compound represented by, for example, the molecular formula (A), in which R is H, p is an integer of 2 to 6, q is an integer of 1 or 2, r is an integer of 1 to 14, and s is an integer of 0 to 13 can be cited.

Preferable examples of such fluorinated ether compounds include: fluorinated compounds of chained aliphatic ether having 2 to 6 carbon atoms and 1 or 2 ether bonds, in which the alkyl group is straight chained or branched; and fluorinated compounds of ring aliphatic ether having 3 to 6 carbon atoms and 1 or 2 ether bonds.

The specific examples thereof include fluorinated dimethyl ethers to which 1 to 6 fluorine atoms are introduced, fluorinated methylethyl ethers to which 1 to 8 fluorine atoms are introduced, fluorinated dimethoxymethanes to which 1 to 8 fluorine atoms are introduced, fluorinated methylpropyl ethers to which 1 to 10 fluorine atoms are introduced, fluorinated methylbutyl ethers to which 1 to 12 fluorine atoms are introduced, fluorinated ethyl propyl ethers to which 1 to 12 fluorine atoms are introduced, fluorinated oxetanes to which 1 to 6 fluorine atoms are introduced, fluorinated 1,3-dioxolans to which 1 to 6 fluorine atoms are introduced, and fluorinated tetrahydrofurans to which 1 to 8 fluorine atoms are introduced.

Examples of such the fluorinated ether compounds include hexafluoro dimethyl ether, pentafluorodimethyl ether, bis(difluoromethyl)ether, fluoromethyl trifluoromethyl ether, trifluoromethyl methyl ether, perfluorodimethoxymethane, 1-trifluoromethoxy-1,1,2,2-tetrafluoroethane, difluoromethoxy pentafluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolan, various isomers of pentafluorooxetane, and various isomers of tetrafluorooxetane.

In the invention, the fluorinated ether compounds may be used singularly or in a combination of two or more kinds thereof.

[Fluorinated Alcohol Compound]

According to the invention, as an example of a fluorinated alcohol compound that can be used as a freezer refrigerant, a fluorinated ether compound represented by, for example, the molecular formula (A) in which R is H, p is an integer of 1 to 6, q is an integer of 1 or 2, r is an integer of 1 to 13, and s is an integer of 1 to 13 can be cited.

Preferable examples of such fluorinated alcohol compounds are fluorinated compounds of linear-chain or branched aliphatic alcohols having 1 to 6 carbon atoms and 1 or 2 hydroxyl groups.

The specific examples thereof include fluorinated methyl alcohols to which 1 to 3 fluorine atoms are introduced, fluorinated ethyl alcohols to which 1 to 5 fluorine atoms are introduced, fluorinated propyl alcohols to which 1 to 7 fluorine atoms are introduced, fluorinated butyl alcohols to which 1 to 9 fluorine atoms are introduced, fluorinated pentyl alcohols to which 1 to 11 fluorine atoms are introduced, fluorinated ethylene glycols to which 1 to 4 fluorine atoms are introduced, and fluorinated propylene glycols to which 1 to 6 fluorine atoms are introduced.

The specific examples of such fluorinated alcohol compounds include fluorinated alcohols: such as monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, and various isomers of octafluorobutyl alcohol; fluorinated propylene glycols such as nonafluorobutyl alcohol, various isomers of difluoroethylene glycol, trifluoroethylene glycol, tetrafluoroethylene glycol, further various isomers of difluoropropylene glycol, various isomers of trifluoropropylene glycol, various isomers of tetrafluoropropylene glycol, various isomers of pentafluoropropylene glycol, and hexafluoropropylene glycol; and fluorinated trimethylene glycols corresponding to the fluorinated propylene glycols.

In the invention, the fluorinated alcohol compounds may be used singularly or in a combination of two or more kinds thereof.

[Fluorinated Ketone Compound]

An example of a fluorinated ketone compound that can be used as a freezer refrigerant according to the invention includes a fluorinated ketone compound represented by, for example, the molecular formula (A) in which R is H, p is an integer of 2 to 6, q is an integer of 1 or 2, r is an integer of 1 to 12, and s is an integer of 0 to 11.

Preferable examples of such fluorinated ketone compounds are fluorinated compounds of aliphatic ketones having 3 to 6 carbon atoms in which the alkyl group is linear-chained or branched.

The specific examples thereof include fluorinated acetones to which 1 to 6 fluorine atoms are introduced, fluorinated methyl ethyl ketones to which 1 to 8 fluorine atoms are introduced, fluorinated diethyl ketones to which 1 to 10 fluorine atoms are introduced, and fluorinated methyl propyl ketones to which 1 to 10 fluorine atoms are introduced.

Examples of the fluorinated ketone compounds include: hexafluorodimethyl ketone, pentafluorodimethyl ketone, bis (difluoromethyl) ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the invention, the fluorinated ketone compounds may be used singularly or in a combination of two or more thereof.

[Other Additives]

The refrigerator oil composition of the invention may be added with at least one additive selected from an extreme pressure agent, an oiliness agent, an antioxidant, an acid scavenger, a metal deactivator and an antifoaming agent.

(Extreme Pressure Agent)

Examples of the extreme pressure agents include phosphorus-base extreme pressure agents such as phosphate ester, acid phosphate ester, phosphite ester, acid phosphite ester and amine salts thereof.

Among the above phosphorus-base extreme pressure agents, particularly preferable examples thereof include tricresyl phosphate, trithiophenyl phosphate, tri(nonylphenyl)phosphite, dioleyl hydrogen phosphite, and 2-ethylhexyl diphenyl phosphite in terms of extreme pressure properties and friction characteristics.

Another example of the extreme pressure agent is a metal salt of carboxylic acid. The metal salt of carboxylic acid is preferably a metal salt of $C_3$ to $C_{60}$ carboxylic acid, more preferably a metal salt of $C_3$ to $C_{30}$ aliphatic acid, particularly preferably a metal salt of $C_{12}$ to $C_{30}$ aliphatic acid. Further, a metal salt of dimer acid or trimer acid of the aliphatic acid, and a metal salt of $C_3$ to $C_{30}$ dicarboxylic acid can be cited. Among these, a metal salt of $C_{12}$ to $C_{30}$ aliphatic acid and a metal salt of $C_3$ to $C_{30}$ dicarboxylic acid are particularly preferable.

On the other hand, a metal of the metal salt is preferably an alkali metal or an alkali earth metal. Particularly, an alkali metal is suitable.

Further, examples of the extreme pressure agents and extreme pressure agents other than those mentioned above include sulfur type extreme pressure agents such as sulfurized fat, sulfurized aliphatic acid, sulfurized ester, sulfurized olefin, dihydrocarvyl polysulphide, thiocarbamates, thioterpenes, and dialkyl thiodipropionates.

The compounding amount of the above extreme pressure agent is in the range of preferably 0.001 to 5% by mass, or particularly preferably 0.005 to 3% by mass with reference to the total amount of the composition in terms of lubricity and stability. Further, the extreme pressure agent may be used singularly or in a combination of two or more thereof.

(Oiliness Agent}

Examples of the oiliness agents include, aliphatic saturated and unsaturated monocarboxylic acids such as stearic acid and oleic acid; polymerized aliphatic acids such as dimer acids and hydrogenated dimer acids; hydroxy aliphatic acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearyl amine and oleylamine; aliphatic saturated and unsaturated monocarboxylic acid amides such as lauric acid amide and oleamide; and partial esters of a polyhydric alcohol such as glycerin and sorbitol, and an aliphatic saturated or unsaturated monocarboxylic acid.

In addition, these oiliness agents may be used singularly or in a combination of two or more kinds thereof. The compounding amount thereof is selected preferably from the range of 0.01 to 10% by mass, more preferably from the range of 0.1 to 5% by mass with respect to a total amount of the composition.

(Antioxidant)

It is preferable to mix, as an antioxidant, a phenol base antioxidant such as 2,6-di-tert-butyl-4-methylphenol, 2,6-di-tert-butyl-4-ethylphenol or 2,2'-methylenebis(4-methyl-6-tert-butylphenol) or an amine-base antioxidant such as phenyl-α-naphthylamine or N,N'-diphenyl-p-phenylenediamine. In view of effects and economic efficiency, the antioxidant is preferably contained in the composition at a content of 0.01 to 5% by mass, more preferably at a content of 0.05 to 3% by mass.

(Acid Scavenger)

Examples of the acid scavengers include epoxy compounds such as phenyl glycidyl ethers, alkyl glycidyl ethers, alkylene glycol glycidyl ethers, cyclohexene oxide, .alpha.-olefin oxide and epoxidized soybean oil. As the acid scavenger, at least one kind selected from glycidyl esters, glycidyl ethers, and α-olefin oxide is preferable.

As the glycidyl ester, glycidyl esters of usually $C_3$ to $C_{30}$, preferably $C_4$ to $C_{24}$, more preferably $C_6$ to $C_{16}$ straight chained, branched or cyclic saturated or unsaturated aliphatic carboxylic acids or aromatic carboxylic acids can be cited. The aliphatic carboxylic acid or aromatic carboxylic acid may be a monocarboxylic acid or a polycarboxylic acid. In the case of the polycarboxylic acid, from the viewpoint of suppressing the acid value from rising to secure the stability of the lubricating oil composition, an entirety of carboxyl groups is preferably glycidyl esterized.

Among these, glycidyl esters of $C_6$ to $C_{16}$ straight chained, branched, or cyclic saturated aliphatic monocarboxylic acids are particularly preferred. Examples of such the glycidyl esters include 2-ethylhexanoic acid glycidyl ester, 3,5,5-trimethylhexanoic acid glycidyl ester, caproic acid glycidyl ester, lauric acid glycidyl ester, versatic acid glycidyl ester, and myristic acid glycidyl ester.

As the glycidyl ether, glycidyl ethers derived from usually $C_3$ to $C_{30}$, preferably $C_4$ to $C_{24}$, more preferably $C_6$ to $C_{16}$ straight chained, branched or cyclic saturated or unsaturated aliphatic monohydric or polyhydric alcohols or aromatic compounds having one or more hydroxyl groups can be cited. In the case of the aliphatic polyhydric alcohols or the aromatic compounds having two or more hydroxyl groups, from the viewpoint of suppressing the hydroxyl group value from rising to secure the stability of the lubricating oil composition, an entire hydroxyl groups is preferably glycidyl etherized.

Among these, glycidyl ethers derived particularly from $C_6$ to $C_{16}$ straight chained, branched, or cyclic saturated aliphatic monohydric alcohols are preferred. Examples of such glycidyl ethers include 2-ethyl ethyl glycidyl ether, isononyl glycidyl ether, caprinoyl glycidyl ether, lauryl glycidyl ether, and myristyl glycidyl ether.

On the other hand, as α-olefin oxide, usually $C_4$ to $C_{50}$, preferably $C_4$ to $C_{24}$, and more preferably $C_6$ to $C_{16}$ α-olefin oxides are used.

In the invention, the acid scavengers may be used singularly or in a combination of two or more kinds thereof. In addition, from the viewpoint of effect and suppression of the sludge generation, it is preferable that the content thereof is usually in the range of 0.005 to 10% by mass, and preferably in the range of 0.05 to 6% by mass with respect to an entire amount of the composition.

(Metal Deactivator, Antifoaming Agent)

As an example of the metal deactivator, a copper deactivator such as N-[N',N'-dialkyl($C_3$ to $C_{12}$ alkyl group) aminomethyl]triazole can be cited. Examples of the antifoaming agent include silicone oil and fluorinated silicone oil.

[Method for Lubricating Refrigerator that Uses Lubricating Oil Composition for Compression Refrigerator]

The lubricating oil composition for a compression refrigerator of the invention is suitable for refrigerators that use a refrigerant containing the $C_1$ to $C_3$ saturated fluorinated hydrocarbon.

In the method of lubricating a refrigerator that uses the lubricating oil composition for a refrigerator according to the invention, used amounts of the refrigerants listed above and the lubricating oil composition for a refrigerator are preferably in a mass ratio of the refrigerant/lubricating oil composition for a refrigerator of 99/1 to 10/90, more preferably in a mass ratio of 95/5 to 30/70. When the used amount of the refrigerant is less than the above range, the freezing capability of the lubricating oil composition is unfavorably deteriorated. On the other hand, when the used amount of the refrigerant is more than the above range, the lubricating capability of the lubricating oil composition is unfavorably deteriorated. The lubricating oil composition for a refrigerator of the invention can be used in various refrigerators and particularly preferably applied to a compression type refrigerating cycle of a compression refrigerator.

[Refrigerator]

A refrigerator to which the lubricating oil composition for a refrigerator of the invention is applied includes a refrigerating cycle that includes a compressor, a condenser, an expansion mechanism (expansion valve and so on) and an evaporator as essential components; or a refrigerating cycle that includes a compressor, a condenser, an expansion mechanism, a dryer, and an evaporator as essential components, uses the lubricating oil composition for refrigerators of the invention described as a refrigerator oil, and uses various refrigerants described above as a refrigerant.

Here, in the above-mentioned dryer, a desiccant formed of zeolite having a pore size of 0.33 nm or smaller is preferably filled. The zeolite, which may be natural zeolite or synthetic zeolite, preferably has a $CO_2$ gas absorption capacity of 1.0% or less at 25° C. and $CO_2$ gas partial pressure of 33 kPa. Examples of such synthetic zeolites include XH-9 (trade name) and XH-600 (trade name) manufactured by Union Showa K.K.

In the invention, with use of such desiccant, while water is efficiently removed without absorption of refrigerant in the refrigerating cycle, the desiccant is prevented from being powderized due to deterioration of the desiccant itself. Accordingly, the choking of piping caused by powderization, and abnormal wear of a sliding part of the compressor caused by invasion of the powderized desiccant into the sliding part of the compressor are prevented. Therefore, the refrigerator can be stably driven for a long time.

The refrigerator to which the lubricating oil composition for refrigerators of the invention is applied has various sliding parts (bearings, for example) in a compressor. In the invention, from the viewpoint particularly of sealability as the sliding part, a sliding part made of engineering plastic, or having an organic coating film or an inorganic coating film can be preferably used.

As the engineering plastic, from the viewpoint of sealability, slidability, and wear resistance, a polyamide resin, a polyphenylene sulfide resin, a polyacetal resin can be preferably cited.

In addition, as the organic coating film, from the viewpoint of sealability, slidability and wear resistance, a fluorine-containing resin coating film (polytetrafluoroethylene coating film), a polyimide coating film, a polyamide coating film, and, a thermo-setting resin insulating film formed with a resin coating material containing a resin base material made of a polyhydroxy ether resin and a polysulfonic resin and a crosslinking agent can be cited.

On the other hand, as the inorganic coating film, from the viewpoint of sealability, slidability, and wear resistance, a graphite film, a diamond-like carbon film, a nickel film, a molybdenum film, a tin film, and a chromium film can be cited. The inorganic film may be formed according to plating or a PVD method (physical vapor deposition method).

As the sliding part, also conventional alloy-base such as Fe-base alloy, Al-base alloy or Cu-base alloy can be used.

[System that Uses Lubricating Oil Composition for Refrigerator]

The lubricating oil composition for a compression refrigerator of the invention can be used for car air conditioners, electric car air conditioners, gas heat-pumps, air conditioners, refrigerated chambers, automatic vending machines, show cases, various hot-water supply systems, and freezing and heating systems.

In the invention, the moisture content in the various systems to which a lubricating oil composition for a refrigerator is applied is preferably 300 ppm by mass or less, and more preferably 200 ppm by mass or less. Further, partial pressure of the residual air in the system is preferably 10 kPa or less and more preferably 5 kPa or less.

The lubricating oil composition for a compression refrigerator of the invention contains, as a base oil, a specific oxygen-containing compound as a main component, and, because of low viscosity, energy saving property can be improved and sealability is excellent.

EXAMPLE

Hereinafter, the invention will be described in more detail with reference to Examples. However, the invention is not at all limited to these examples.

Properties of the base oil and various characteristics of the lubricating oil composition for refrigerators were obtained according to the procedure shown below.

<Properties of Base Oil>

(1) Kinematic Viscosity at 100° C.

The kinematic viscosity at 100° C. was measured according to JIS K 2283-1983 by using a glass capillary viscometer.

(2) Number Average Molecular Weight

The number average molecular weight was measured by gel permeation chromatography (GPC). The GPC was conducted using HLC-8120GPC, SC-8020 (trade name, manufactured by TOSOH Corporation), THF (tetrahydrofuran) as an eluting solution, and an IR detector. From the result, based on a calibration curve due to polystyrene reference sample, the number average molecular weight was obtained.

(3) Flashing Point

The flashing point was measured according to JIS K 2265 (C.O.C method).

(4) Viscosity Index

The viscosity index was measured according to JIS K 2283.

<Thermal Stability Test of Lubricating Oil Composition for Refrigerators>

In a 200 mL autoclave, oil/refrigerant (ratio: 30 g/30 g, moisture content in oil: 500 ppm by mass), and a metal catalyst made of iron, copper and aluminum were charged and encapsulated, after keeping under condition of air pressure of 18.7 kPa, and temperature of 200° C. for 240 hr, oil appearance was visually observed, and the acid value was measured. The acid value was measured by an indicator method according to "Petroleum products and lubricants-Neutralization Test Method" stipulated by JIS K 2501.

<Compounding Component>

Kinds of respective components used to prepare the lubricating oil composition for a refrigerator are shown below.

(1) Base Oil

A1: Poly(ethyl vinyl ether) (kinematic viscosity at 100° C.: 15.97 mm$^2$/s, flashing point: 222° C., the number average molecular weight: 1250, viscosity index: 85)

A2: Polypropylene glycol dimethyl ether (kinematic viscosity at 100° C.: 9.25 mm$^2$/s, flashing point: 212° C., the number average molecular weight: 1139, viscosity index: 207)

A3: Polypropylene glycol (PPG)/poly(ethyl vinyl ether) (PEV) copolymer (PPG/EVE molar ratio: 7/11)(kinematic viscosity at 100° C.: 9.56 mm$^2$/s, flashing point: 218° C., the number average molecular weight: 1200, viscosity index: 140)

A4: Pentaerythritol octanoic acid ($C_8$ acid) nonanoic acid ($C_9$ acid) ester ($C_8$ acid/$C_9$ acid molar ratio: 1/1.1) (kinematic viscosity at 100° C.: 9.64 mm$^2$/s, flashing point: 268° C., the number average molecular weight: 670, viscosity index: 126)

(2) Stabilizer (Organic Compound Having Double Bond in Molecule)

B1: β-pinene
B2: 1,4-p-mentadiene
B3: 1,4-cyclohexadiene
B4: 1,4-hexadiene
B5: 2,5-norbornadiene
B6: 1-hexadecene (3) Additive With the following respective components, compounding amounts in an entire composition were set respectively to amounts (% by mass) shown in bracket, and the extreme pressure agent and defoaming agent (other additives) were added to be 1.10% by mass in total.

Acid scavenger: 2-ethylhexyl glycidyl ether (0.3% by mass)

Antioxidant: 2,6-di-t-butyl-4-methyl phenol (0.3% by mass)

Extreme pressure agent: tricresyl phosphate (1.0% by mass)

Antifoaming agent: silicone-based antifoaming agent (0.1% by mass)

Examples 1 to 9 and Comparative Examples 1 to 7

Lubricating oil compositions for a refrigerator each having a composition shown in Table 1 and Table 2 were prepared, and with R32 (difluoromethane) or R410A [50:50 mixture by mass ratio of R32 and R125 (pentafluoroethane)] as a refrigerant, the thermal stability of the compositions were evaluated. Results thereof are shown in Table 1 and Table 2.

TABLE 1

TABLE 1-1

| | | | Examples | | | | | | | | |
|---|---|---|---|---|---|---|---|---|---|---|---|
| | | | 1 | 2 | 3 | 4 | 5 | 6 | 7 | 8 | 9 |
| Compounded composition (% by mass) | Base oil | A1 | 97.3 | 97.3 | 97.3 | 97.3 | 97.3 | 97.3 | — | — | — |
| | | A2 | — | — | — | — | — | — | 97.3 | — | — |
| | | A3 | — | — | — | — | — | — | — | 97.3 | — |
| | | A4 | — | — | — | — | — | — | — | — | 97.3 |
| | Stabilizer | B1 | 1.0 | — | — | — | — | — | 1.0 | 1.0 | 1.0 |
| | | B2 | — | 1.0 | — | — | — | — | — | — | — |
| | | B3 | — | — | 1.0 | — | — | — | — | — | — |
| | | B4 | — | — | — | 1.0 | — | — | — | — | — |
| | | B5 | — | — | — | — | 1.0 | — | — | — | — |
| | | B6 | — | — | — | — | — | 1.0 | — | — | — |
| | Antioxidant | | 0.3 | 0.3 | 0.3 | 0.3 | 0.3 | 0.3 | 0.3 | 0.3 | 0.3 |
| | Acid scavenger | | 0.3 | 0.3 | 0.3 | 0.3 | 0.3 | 0.3 | 0.3 | 0.3 | 0.3 |
| | Other additive | | 1.1 | 1.1 | 1.1 | 1.1 | 1.1 | 1.1 | 1.1 | 1.1 | 1.1 |
| Thermal stability test | Refrigerant | | | | | | R32 | | | | |
| | Acid value (mgKOH/g) | | 0.71 | 0.81 | 0.82 | 0.86 | 0.79 | 1.02 | 0.78 | 0.75 | 0.82 |
| | Oil appearance | | Pale yellow | Pale yellow | Pale yellow | Pale yellow | Pale yellow | Pale yellow | Pale yellow | Pale yellow | Pale yellow |

TABLE 2

Table 1-2

| | | | Comparative Examples | | | | | | |
|---|---|---|---|---|---|---|---|---|---|
| | | | 1 | 2 | 3 | 4 | 5 | 6 | 7 |
| Compounded composition (% by | Base oil | A1 | 98.3 | 98.3 | 98.1 | 97.6 | — | — | — |
| | | A2 | — | — | — | — | 98.3 | — | — |
| | | A3 | — | — | — | — | — | 98.3 | — |
| | | A4 | — | — | — | — | — | — | 98.3 |
| | Antioxidant | | 0.3 | 0.3 | 0.5 | 0.3 | 0.3 | 0.3 | 0.3 |

TABLE 2-continued

Table 1-2

|  |  | Comparative Examples | | | | | | |
|---|---|---|---|---|---|---|---|---|
|  |  | 1 | 2 | 3 | 4 | 5 | 6 | 7 |
| mass) | Acid scavenger | 0.3 | 0.3 | 0.3 | 1.0 | 0.3 | 0.3 | 0.3 |
|  | Other additive | 1.1 | 1.1 | 1.1 | 1.1 | 1.1 | 1.1 | 1.1 |
| Thermal | Refrigerant | R32 | R410A | R32 | R32 | R32 | R32 | R32 |
| stability test | Acid value (mgKOH/g) | 1.54 | 1.20 | 1.55 | 1.51 | 1.40 | 1.55 | 1.56 |
|  | Oil appearance | Orange | Yellow | Orange | Orange | Orange | Orange | Orange |

From Table 1 and Table 2, the followings are found.

In all of Examples 1 to 9 where a lubricating oil composition for a compression refrigerator of the invention was used in a system where R32 (difluoromethane) was used as a refrigerant, in thermal and oxidation stability test, oil appearance was excellent and also the acid value was low.

By contrast, in Comparative Examples 1 to 7 where an organic compound (stabilizer) having a double bond in the molecule according to the invention was not used, not only the acid value was high, but also the oil appearance turned to yellow or orange.

Further, Comparative Example 1 where the same lubricating oil composition for a compression refrigerator in the invention, in which the stabilizer was not used was used, and R32 (difluoromethane 100%) was used as the refrigerant compared poorly with Comparative example 2 where R410A (a refrigerant obtained by mixing R32 and R125 at a mass ratio of 50:50) was used as a refrigerant in that the acid value was high and oil appearance was orange or yellow.

INDUSTRIAL APPLICABILITY

The lubricating oil composition for a compression refrigerator of the invention exhibits excellent thermal and oxidation stability when used in a compression refrigerator that uses a refrigerant that uses $C_1$ to $C_3$ saturated fluorinated hydrocarbon that is a refrigerant that is low in the global warming potent and can be used in particular in an air conditioner and a car air conditioner.

The invention claimed is:

1. A composition, comprising a lubricating oil and a refrigerant, wherein:
    the lubricating oil comprises:
        a base oil;
        an organic compound having a double bond, which consists of α-pinene, β-pinene, or both; and
        at least one epoxy compound selected from the group consisting of a glycidyl ester, an alkyl glycidyl ether and an alkylene glycol glycidyl ether;
    the refrigerant consists of difluoromethane;
    the refrigerant is the only saturated fluorinated compound in the composition;
    the base oil consists of at least one polyvinyl ether;
    a content of the organic compound having a double bond is 0.1% by mass or more and 5% by mass or less based on a total mass of the composition; and
    a content the at least one epoxy compound is 0.05% by mass or more and 6% by mass or less based on the total mass of the composition.

2. The composition according to claim 1, further comprising a compound having a 1,4-diene structure.

3. The composition according to claim 1, wherein the composition comprises the organic compound having a double bond in an amount of from 0.1% by mass to 3% by mass based on a total amount of the composition.

4. The composition according to claim 1, wherein the base oil consists of a polyvinyl ether.

5. The composition according to claim 1, wherein the base oil has a kinematic viscosity of from 1 mm$^2$/s to 50 mm$^2$/s at 100° C.

6. The composition according to claim 1, wherein the base oil has a number average molecular weight of from 300 to 3000.

7. The composition according to claim 1, wherein the base oil has a viscosity index of 60 or more.

8. The composition according to claim 1, further comprising:
    at least additive selected from the group consisting of an extreme pressure agent, an oiliness agent, an antioxidant, an acid scavenger, a metal deactivator, and an antifoaming agent.

9. The composition according to claim 1, wherein the composition is suitable for a car air conditioner, an electric car air conditioner, a gas heat pump, an air conditioner, a refrigerator, an automatic vending machine, a show case, a hot-water supply system, a freezing and heating system, or any combination thereof.

10. The composition according to claim 1, wherein the composition is suitable for a hot-water supply system having a moisture content of 300 ppm by mass or less and a residual air partial pressure of 10 kPa or less.

11. The composition according to claim 1, wherein the composition is suitable for a freezing and heating system having a moisture content of 300 ppm by mass or less and a residual air partial pressure of 10 kPa or less.

12. The composition according to claim 1, wherein the base oil has an ASTM color of 1 or less.

13. The composition according to claim 1, wherein the organic compound having a double bond is β-pinene.

* * * * *